United States Patent
Ricard et al.

(10) Patent No.: US 11,533,505 B2
(45) Date of Patent: Dec. 20, 2022

(54) METHOD FOR ENCODING/DECODING TEXTURE OF POINTS OF A POINT CLOUD

(71) Applicant: InterDigital VC Holdings, Inc., Wilmington, DE (US)

(72) Inventors: Julien Ricard, Plouer-sur-Rance (FR); Celine Guede, Cesson-Sevigne (FR); Joan Llach, Cesson-Sevigne (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 17/258,694

(22) PCT Filed: Jul. 11, 2019

(86) PCT No.: PCT/US2019/041281
§ 371 (c)(1),
(2) Date: Jan. 7, 2021

(87) PCT Pub. No.: WO2020/014408
PCT Pub. Date: Jan. 16, 2020

(65) Prior Publication Data
US 2021/0274219 A1      Sep. 2, 2021

(30) Foreign Application Priority Data
Jul. 11, 2018   (EP) ..................... 18305936

(51) Int. Cl.
*H04N 19/20*       (2014.01)
*H04N 19/59*       (2014.01)
(Continued)

(52) U.S. Cl.
CPC ............... *H04N 19/59* (2014.11); *G06T 9/00* (2013.01); *H04N 19/186* (2014.11); *H04N 19/20* (2014.11)

(58) Field of Classification Search
CPC ......... H04N 19/59; H04N 19/186; G06T 9/00
(Continued)

(56) References Cited

U.S. PATENT DOCUMENTS 10,032,255 B2    7/2018  Askan
2017/0347055 A1  11/2017 Dore et al.
(Continued)

FOREIGN PATENT DOCUMENTS

| CN | 108242064 A | 7/2018 |
| EP | 3554082 A1 | 10/2019 |
| WO | 2019142164 A1 | 7/2019 |

OTHER PUBLICATIONS

Muratov et al. "3DCapture: 3D Reconstruction for a Smartphone", 2016 IEEE Conference on Computer Vision and Pattern Recognition Workshops (CVPRW), Las Vegas, Nevada, United States, Jun. 26, 2016, pp. 75-82 (Year: 2016).*
(Continued)

*Primary Examiner* — Ayman A Abaza
(74) *Attorney, Agent, or Firm* — Volpe Koenig

(57) ABSTRACT

A method and device for point cloud compression are provided. A bitstream is generated that comprises color information data representative of a texture image from which points of the point cloud are colorized when reconstructing the point cloud. The bitstream also comprises an interpolation texture coding mode indicating that texture interpolation has to be done on points of the reconstructed point cloud that are not colorized from the texture image.

17 Claims, 8 Drawing Sheets

(51) Int. Cl.
*H04N 19/186* (2014.01)
*G06T 9/00* (2006.01)

(58) Field of Classification Search
USPC .................................................. 375/240.12
See application file for complete search history.

(56) References Cited

U.S. PATENT DOCUMENTS

| | | | |
|---|---|---|---|
| 2018/0268570 A1 | 9/2018 | Budagavi et al. | |
| 2019/0087979 A1* | 3/2019 | Mammou | G06T 9/001 |
| 2020/0014940 A1* | 1/2020 | Dawar | H04N 19/80 |
| 2021/0174559 A1* | 6/2021 | Nakagami | G06T 7/50 |

OTHER PUBLICATIONS

A. Abdelhafiz, B. Riedel, W. Niemeier, "Towards a 3D True Colored Space by the Fusion of Laser Scanner Point Cloud and Digital Photos", International Society for Photogrammety and Remote Sensing ISPRS, Archives—vol. XXXVI-5/W17, Aug. 2005 (Year: 2005).*

Mammou, K. (ED.), "PCC Test Model Category 2 v0", International Organization for Standardization, ISO/IEC JTC1/SC29/WG11, Coding of Moving Picture and Audio, Document N17248, Macau, China, Oct. 2017, 11 pages.

Pavez et al., "Dynamic Polygon Cloud Compression", 2017 IEEE International Conference on Acoustics, Speech and Signal Processing (ICASSP), New Orleans, Lousiana, United States, Mar. 5, 2017, 16 pages.

Muratov et al., "3DCapture: 3D Reconstruction for a Smartphone", 2016 IEEE Conference on Computer Vision and Pattern Recognition Workshops (CVPRW), Las Vegas, Nevada, United States, Jun. 26, 2016.

Abdelhafiz et al., "Towards a 3D True Colored Space by the Fusion of Laser Scanner Point Cloud and Digital Photos", International Society for Photogrammetry and Remote Sensing ISPRS, Archives—vol. XXXVI-5/W17, Aug. 2005, 7 pages.

Anonymous, "High Efficiency Video Coding", International Telecommunications Union (ITU), Series H: Audiovisual and Multimedia Systems Infrastructure of audiovisual services—Coding of moving video, Recommendation ITU-T H.265, Oct. 2014, 540 pages.

Technicolor, "Geometry Imago Coding Improvements," International Organisation for Standardisation, ISO/IEC JTC1/SC29/WG11 (Jan. 2018).

* cited by examiner

METHOD FOR ENCODING/DECODING TEXTURE OF POINTS OF A POINT CLOUD

This application claims the benefit, under 35 U.S.C. § 371 of International Application PCT/US2019/041281, filed Jul. 11, 2019, which was published in accordance with PCT Article 21(2) on Jan. 16, 2022, in English, and which claims the benefit of European Patent Application No. 18305936.9, filed Jul. 11, 2018.

FIELD

The present embodiments generally relate to coding and decoding of 3D image data representing the geometry and colors of point cloud.

BACKGROUND

The present section is intended to introduce the reader to various aspects of art, which may be related to various aspects of the present embodiments that are described and/or claimed below. This discussion is believed to be helpful in providing the reader with background information to facilitate a better understanding of the various aspects of the present embodiments. Accordingly, it should be understood that these statements are to be read in this light, and not as admissions of prior art.

A point cloud is a set of data points in some coordinate system. In a three-dimensional coordinate system (3D space), these points are usually intended to represent the external surface of a 3D object. Each point of a point cloud is often defined by its location (X, Y, and Z coordinates in the 3D space) and possibly by other associated attributes such as a color, represented in the RGB or YUV color space for example, a transparency, a reflectance, a two-component normal vector, etc.

In the following, a colored point cloud considered, i.e. a set of 6-components points (X, Y, Z, R, G, B) or equivalently (X, Y, Z, Y, U, V) where (X, Y, Z) defines the coordinates of a colored point in a 3D space and (R, G, B) or (Y, u, V) defines a color of this colored point.

Colored point clouds may be static or dynamic depending on whether or not the cloud evolves with respect to time. It should be noticed that in case of a dynamic point cloud, the number of points is not constant but, on the contrary, generally evolves with time. A dynamic point cloud is thus a time-ordered list of set of points.

Practically, colored point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge.

Another use case is in topography and cartography in which using 3D representations, maps are not limited to the plane and may include the relief. Google Maps is now a good example of 3D maps but uses meshes instead of point clouds. Nevertheless, point clouds may be a suitable data format for 3D maps and such point clouds are typically static, colored and huge.

Automotive industry and autonomous car are also domains in which point clouds may be used. Autonomous cars should be able to "probe" their environment to take good driving decision based on the reality of their immediate neighboring. Typical sensors like LIDARs produce dynamic point clouds that are used by the decision engine. These point clouds are not intended to be viewed by a human being and they are typically small, not necessarily colored, and dynamic with a high frequency of capture. They may have other attributes like the reflectance provided by the Lidar as this attribute is a good information on the material of the sensed object and may help the decision.

Virtual Reality and immersive worlds have become a hot topic recently and foreseen by many as the future of 2D flat video. The basic idea is to immerse the viewer in an environment all round him by opposition to standard TV where he can only look at the virtual world in front of him. There are several gradations in the immersivity depending on the freedom of the viewer in the environment. Colored point cloud is a good format candidate to distribute Virtual Reality (or VR) worlds. They may be static or dynamic and are typically of averaged size, say no more than millions of points at a time.

It is crucial to be able to distribute dynamic colored point clouds to the end-user with a reasonable consumption of bit-rate while maintaining an acceptable (or preferably very good) quality of experience. Efficient compression of these dynamic colored point clouds is a key point in order to make the distribution chain of immersive worlds practical.

In the following, a picture contains one or several arrays of samples (pixel values) in a specific picture/video format which specifies all information relative to the pixel values of a picture (or a video) and all information which may be used by a display and/or any other device to visualize and/or decode a picture (or video) for example. A picture comprises at least one component, in the shape of a first array of samples, usually a luma (or luminance) component, and, possibly, at least one other component, in the shape of at least one other array of samples, usually a color component. Or, equivalently, the same information may also be represented by a set of arrays of color samples, such as the traditional tri-chromatic RGB representation.

Image-based point cloud compression techniques are becoming increasingly popular due to their combination of compression efficiency and low complexity. They proceed in two main steps: first, they project (orthogonal projection) the point cloud, i.e. the 3D points, onto 2D images. For example, at least one depth image represents the geometry of the point cloud, i.e. the spatial locations (coordinates) of the 3D points in a 3D space and at least one texture image represents an attribute associated with the 3D points of the point cloud, e.g. a texture/color information associated to those 3D points. Next, these techniques encode such depth and texture images with legacy video encoders. They achieve good compression performance by leveraging the performance of 2D video encoder, like for HEVC ("*ITU-T H.265 Telecommunication standardization sector of ITU* (10/2014), *series H: audiovisual and multimedia systems, infrastructure of audiovisual services—coding of moving video, High efficiency video coding, Recommendation ITU-T H.265*"), while at the same time, they keep complexity low by using simple projection schemes.

One of the challenges of Image-based point cloud compression techniques is that a point cloud may not be suitable for projection onto images, especially when the point distribution follows a surface with many folds (concave/convex regions, like in clothing) or when the point distribution does not follow a surface at all (like in fur or hair). In these situations, image-based point cloud compression techniques suffer from low compression efficiency (many small projections are required, reducing the efficiency of the 2D video compression) or bad quality (due to the difficulty of projecting the point cloud onto a surface).

One of the approaches used in the state of the art to alleviate this problem consists in projecting multiple geometry and texture information onto a same spatial location (pixel) of an image. This means that several depth and/or texture images are generated per 3D point of the point cloud.

This is the case, for example, of the point cloud encoder as defined in ISO/IEC JTC1/SC29/WG11/N17248, Macau, China, October 2017 (TMC2) in which two depth images (representative of the geometry of the point cloud) and two texture images (representative of the color/texture of the point cloud) are encoded.

Compressing efficiently texture images obtained by projecting points of a point cloud onto a projection plane is an issue.

SUMMARY

The following presents a simplified summary of the present embodiments in order to provide a basic understanding of some aspects of the present embodiments. This summary is not an extensive overview of the present embodiments. It is not intended to identify key or critical elements of the present embodiments. The following summary merely presents some aspects of the present embodiments in a simplified form as a prelude to the more detailed description provided below.

The present embodiments relate to a method for generating and encoding in a bitstream an interpolation texture coding mode indicating that the bitstream contains color information data representative of a texture image and that texture interpolation has to be done on point of a reconstructed point cloud that are not colorized from said color information data.

The present embodiments also relate to a method comprising checking if a contains an interpolation texture coding mode indicating that a bitstream contains color information data representative of a texture image and that texture interpolation has to be done on point of a reconstructed point cloud that are not colorized from said color information data, reconstructing a first texture image from said color information data and, and assigning colors are to points of the reconstructed point cloud that are not colorized from said color information data.

The specific nature of the present embodiments as well as other objects, advantages, features and uses of the present embodiments will become evident from the following description of examples taken in conjunction with the accompanying drawings.

BRIEF DESCRIPTION OF DRAWINGS

In the drawings, examples of the present embodiments are illustrated. It shows.

Similar or same elements are referenced with the same reference numbers.

DESCRIPTION OF EXAMPLE OF THE PRESENT EMBODIMENTS

Figure 1:
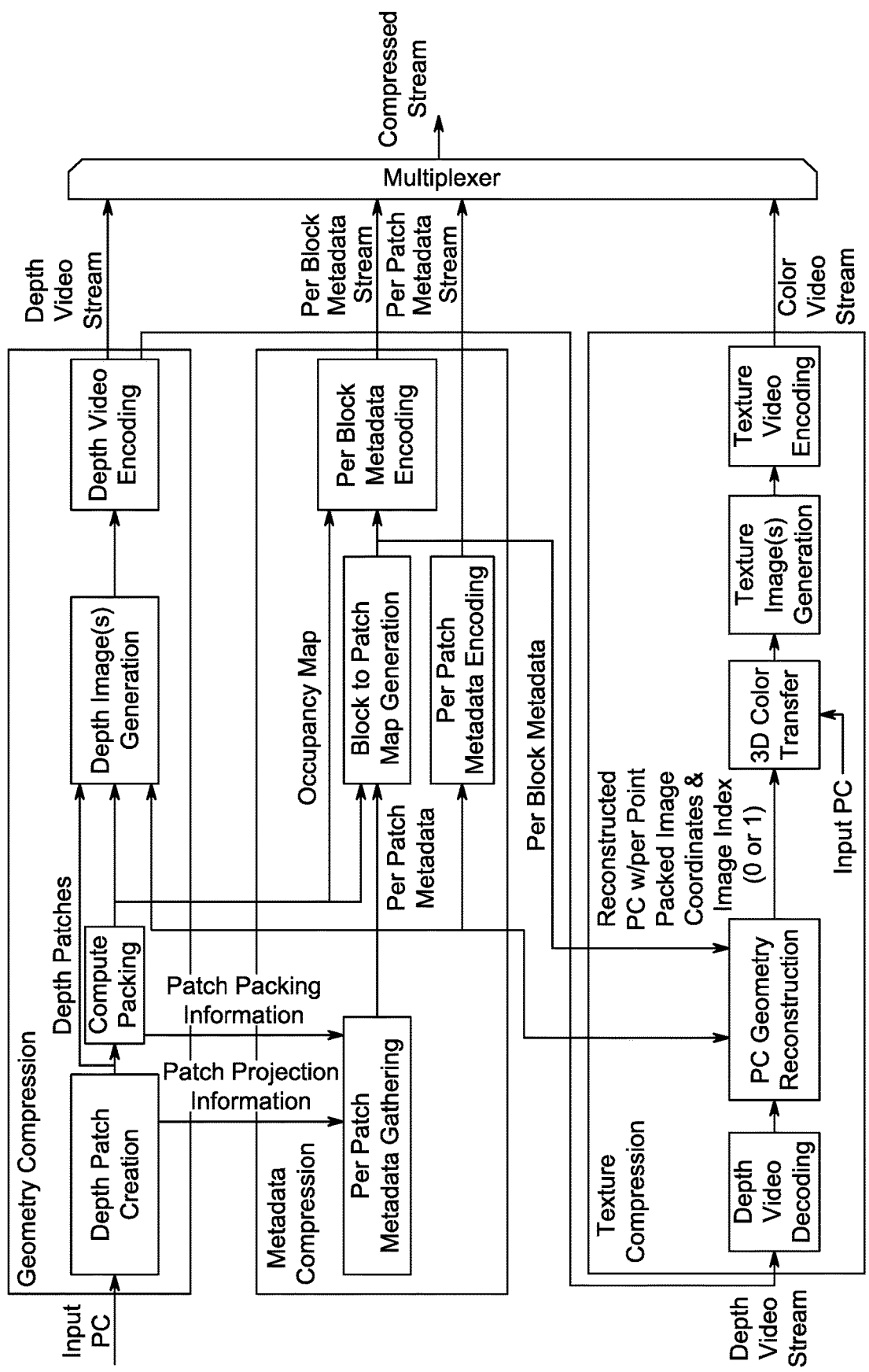
FIG. 1 shows an overview of the TMC2 encoder.

The present embodiments will be described more fully hereinafter with reference to the accompanying figures, in which examples of the present embodiments are shown. The present embodiments may, however, be embodied in many alternate forms and should not be construed as limited to the examples set forth herein. Accordingly, while the present embodiments are susceptible to various modifications and alternative forms, specific examples thereof are shown by way of examples in the drawings and will herein be described in detail. It should be understood, however, that there is no intent to limit the present embodiments to the particular forms disclosed, but on the contrary, the disclosure is to cover all modifications, equivalents, and alternatives falling within the spirit and scope of the present embodiments as defined by the claims.

The terminology used herein is for the purpose of describing particular examples only and is not intended to be limiting of the present embodiments. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present embodiments.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present embodiments. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or sub-combination.

A pixel value is represented by a vector of C values, where C is the number of components. Each value of a vector is represented with a number of bits which defines a maximal dynamic range of the pixel values.

A block of a picture means a set of pixels which belong to this picture and the pixel values of a block means the values of the pixels which belong to this block.

One of the approaches (MPEG 3DG/PCC's Test Model for Category 2, called TMC2) used in the state of the art to encode a point cloud consists on projecting multiple geometry and texture information onto the same position (pixel) of the 2D image. This means that several 2D geometry and/or 2D texture images are generated per input point cloud. In the case of TMC2 (Category 2 test model of the MPEG 3DG Ad Hoc on Point Cloud Compression) two depth (for geometry) and color (for texture) images are encoded per input point cloud.

FIG. 1 shows an overview of the TMC2 point cloud encoder. The top row (geometry compression) encodes the geometry information of the point cloud by means of a depth image. The middle row (metadata compression) encodes metadata required to reconstruct the geometry of the original point cloud from the depth image. The bottom row (texture compression) encodes the color information of the reconstructed geometry by means of a color image.

Figure 2:
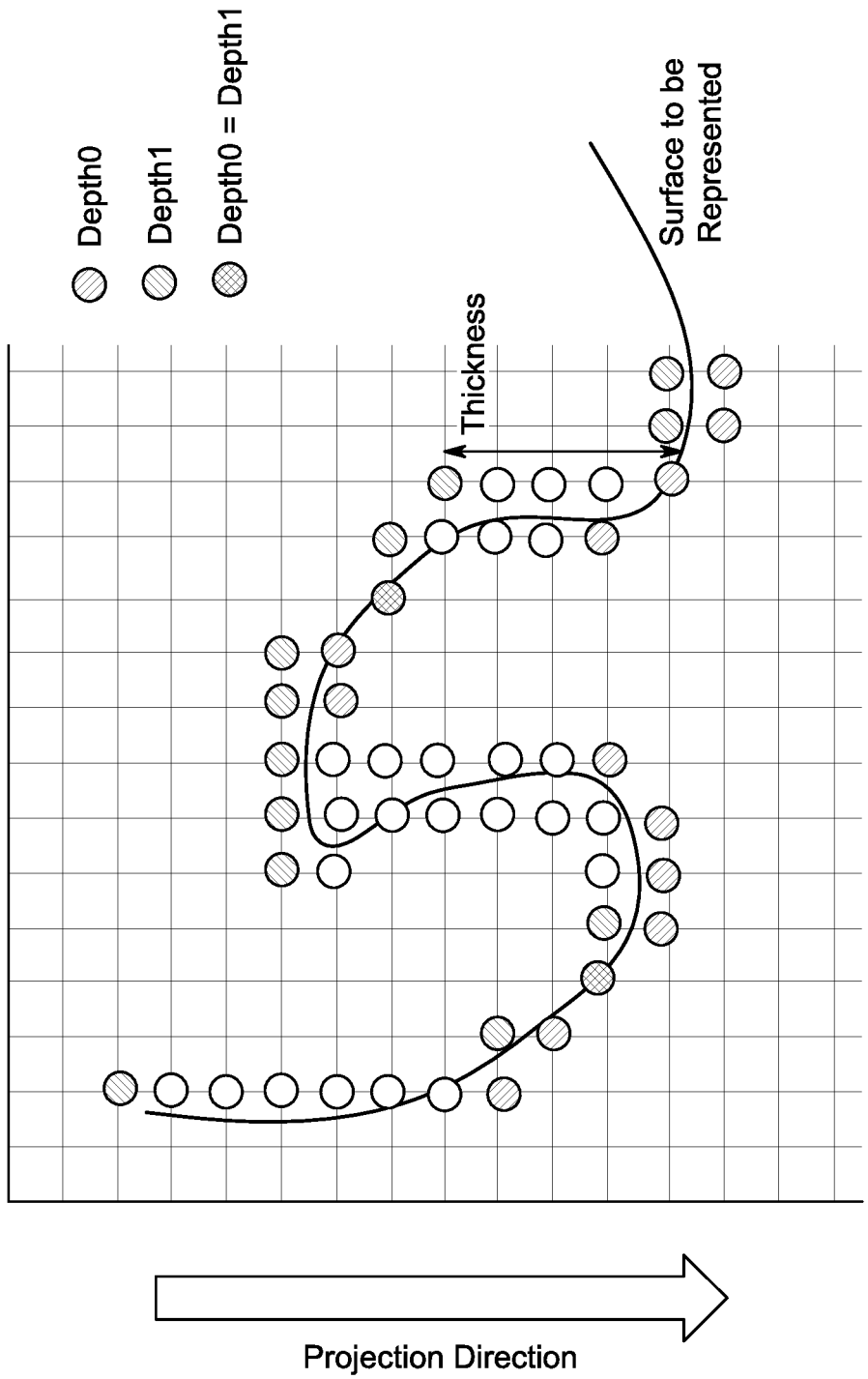
FIG. 2 illustrates depth values associated with points of a point cloud.

As shown in FIG. 1, the TMC2 test model keeps two values per coordinate of the projection plane: the smallest (depth0) and the largest (depth1) depth. By doing this, it better captures the distribution of points in 3D space, at the expense of increasing the amount of projected data to be encoded as shown in FIG. 2.

Concerning the texture compression, two texture images are generated. From the two geometry images, the encoder is able to reconstruct the point cloud in the 3D space. Then with the source point cloud, a 3D color transfer process is made. It assigned for each reconstructed point a color according to the algorithm described in the following section entitled 'Color Approximation".

Figure 3:
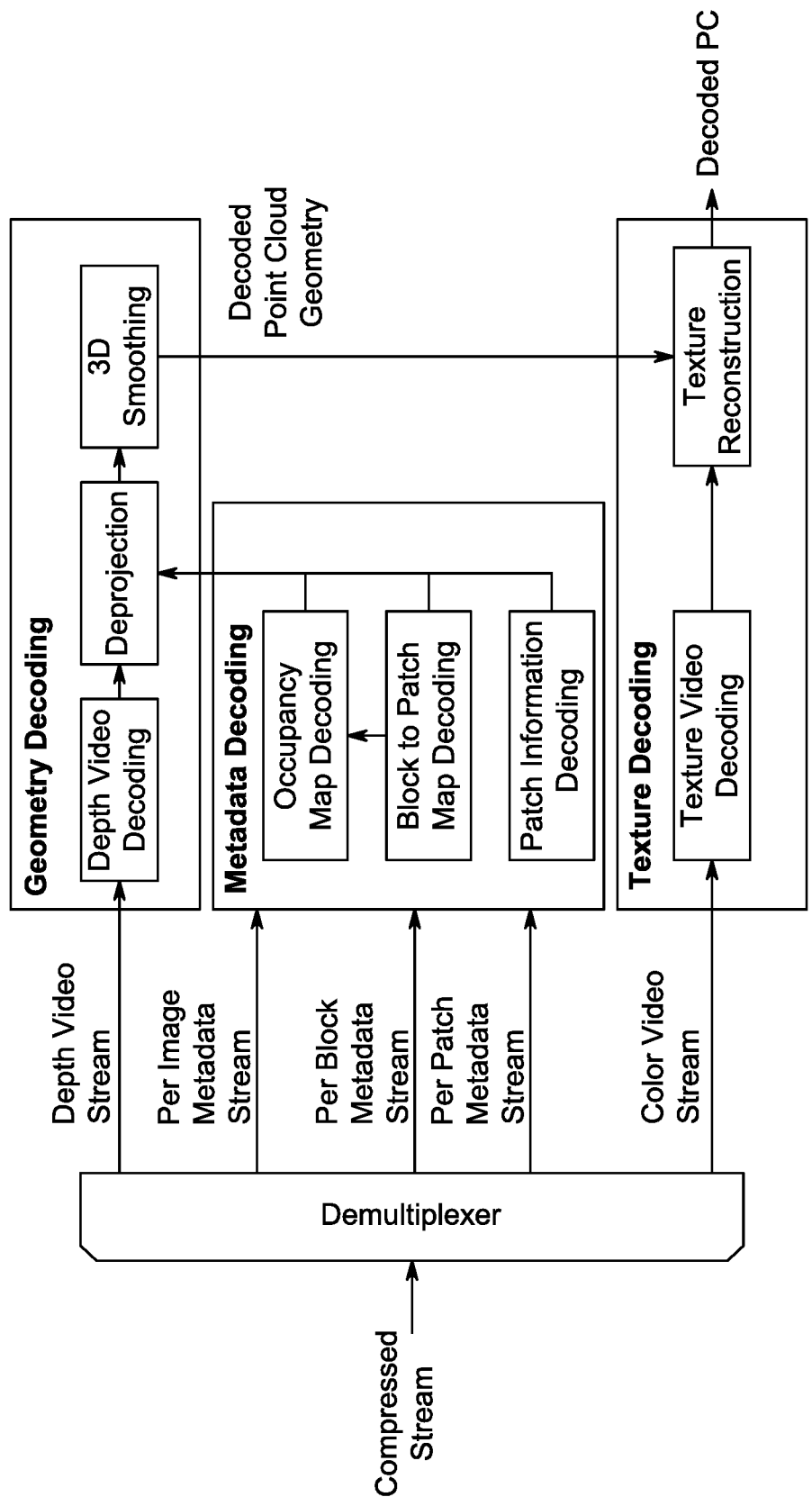
FIG. 3 shows an overview of the TMC2 decoder.

On the decoder side, as shown in FIG. 3, TMC2 decodes depth video stream and color video stream and reconstructs the point cloud using the metatdata:

Occupancy map and bock to patch index

Patch metadata: $x_0$, $y_0$, $z_0$ coordinates, projection axis, bounding box

Concerning the texture decoding, two textures images are generated from the source point cloud: T0 is the texture image that contains the color of source points that are put in correspondence during the color transfer process with reconstructed point cloud of Depth 0; T1 is the same for Depth 1 image.

Figure 4:
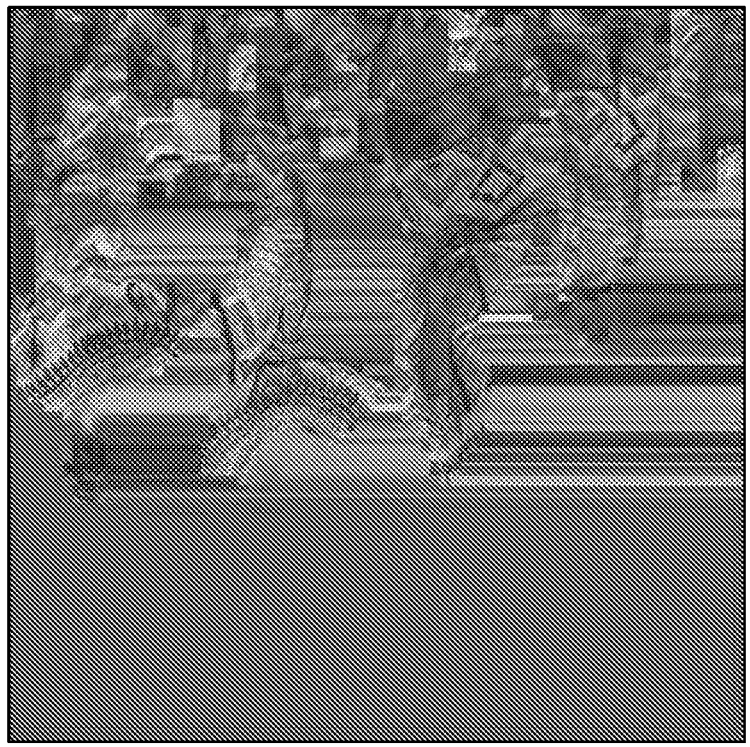
FIG. 4 shows examples of decoded texture images.
Figure 4:
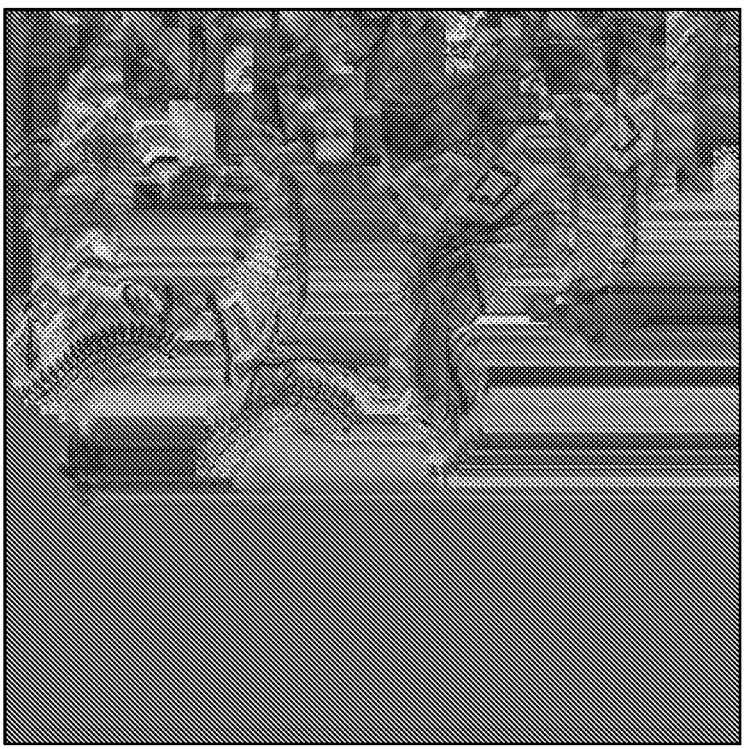

On FIG. 4, the example shows that decoded texture images T0 and T1.

Figure 5:
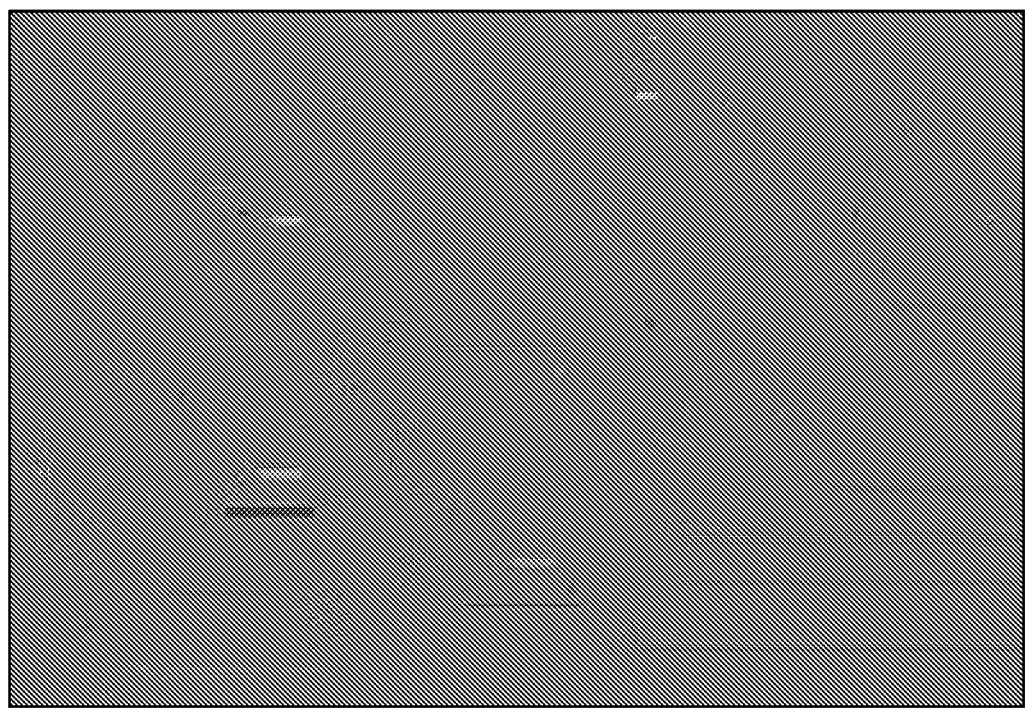
FIG. 5 shows a difference between two texture images.

What we observe is that T0 and T1 are not too far from each other. The difference between both images is shown in FIG. 5.

Even if the video encoder takes advantage of the fact that theses images are not too far, it has a cost in term of bitrate and processing time.

The present embodiments relate to a method that interpolates the T1 texture image from the T0 texture image rather than transmitting said T1 texture image as in prior art.

This results in a gain in term of bitrate as the texture T1 is not transmitted and in term of computing complexity of both the encoding and decoding.

According to the present embodiments, interpolating T1 from T0 only when a color video bitstream indicates that the texture interpolation has to be applied and in that case the color video bitstream also indicates which mode has to be applied.

On the encoder side, at least one interpolation texture coding mode is generated. An interpolation texture coding mode indicates that the color video bitstream contains color information data representative of a first texture image and that texture interpolation has to be done on point of a reconstructed point cloud that are not colorized from said color information data. A point is considered as being non colorized when a color is not yet assigned to it from said color information data.

In a variant, said interpolation texture coding mode may also indicates which interpolation process to be used.

Figure 6:
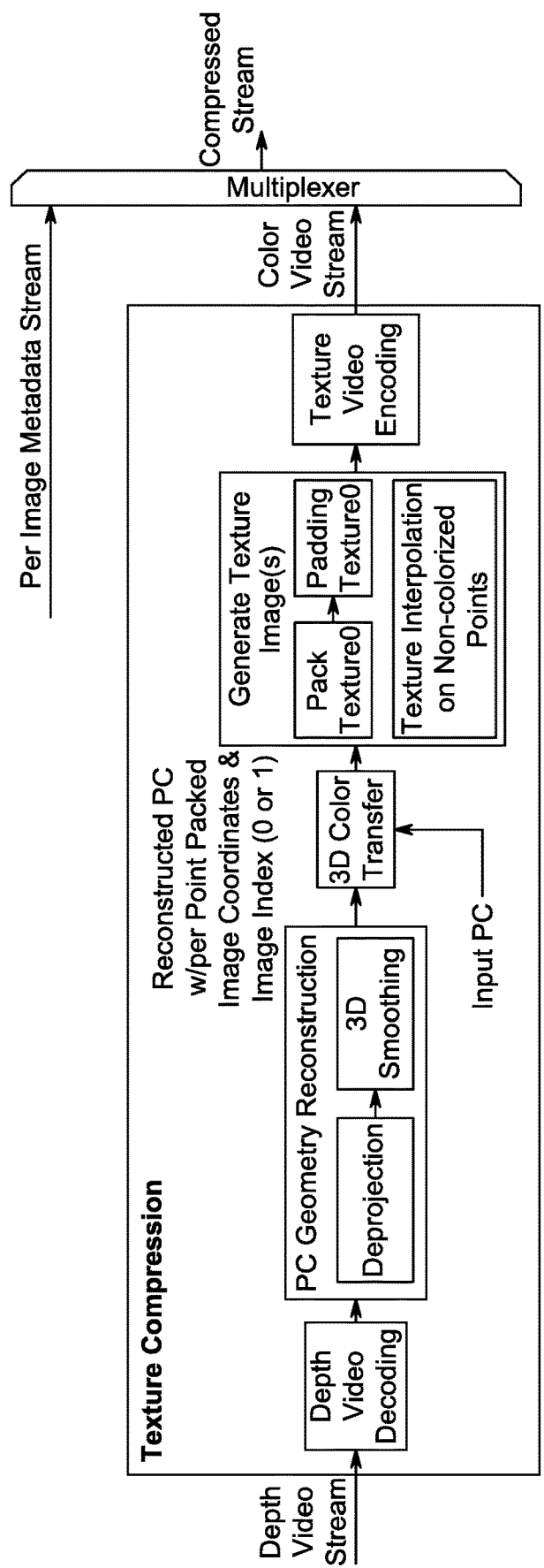
FIG. 6 shows an example of the proposed texture encoding in a path for generating texture.

FIG. 6 shows an example of the proposed texture encoding in a path for generating texture.

Figure 7:
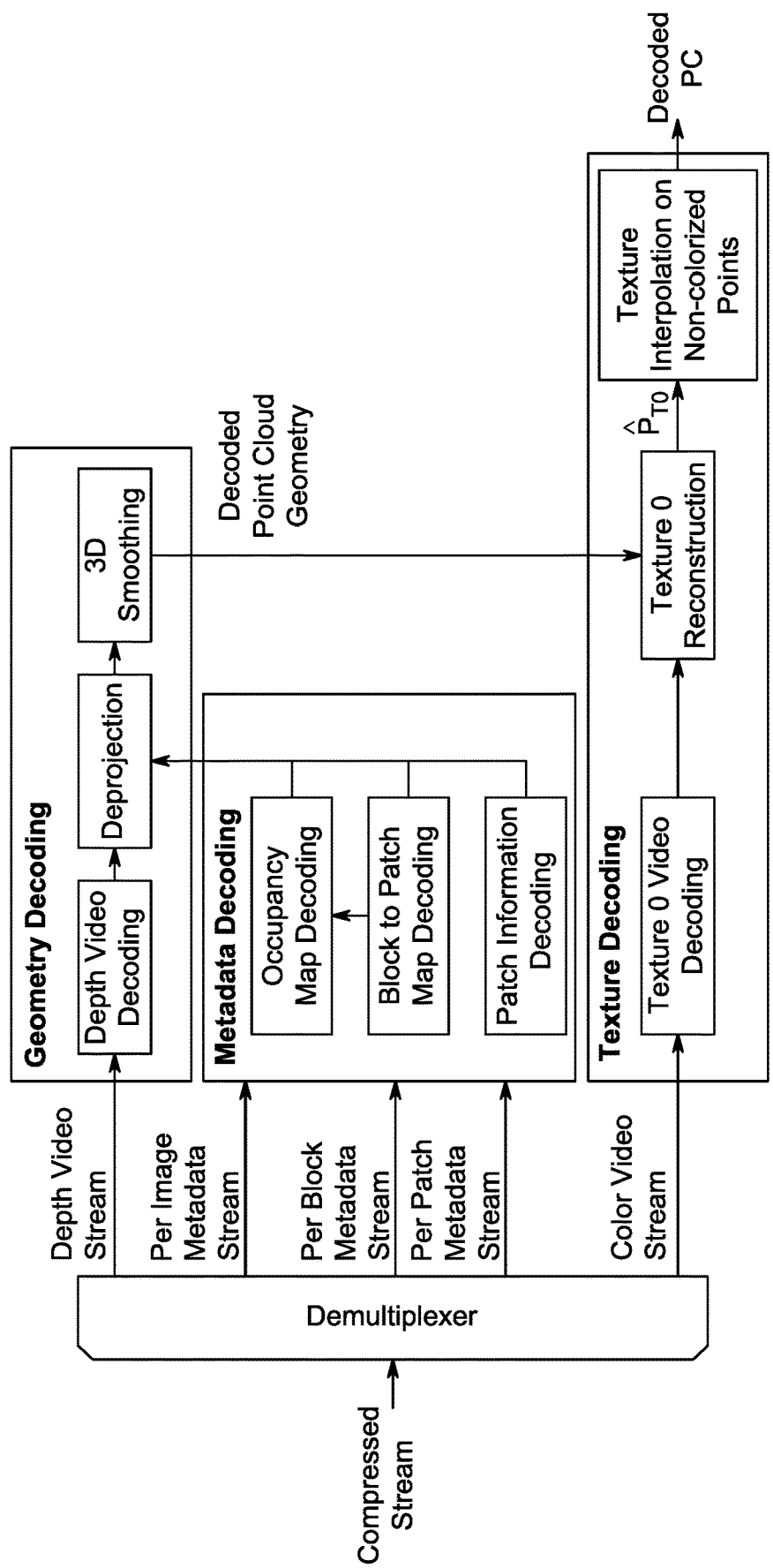
FIG. 7 shows an example of the proposed texture decoding in a path for reconstructing/decoding texture of a point cloud.

On decoder side, if the color video stream contains interpolation texture coding mode indicating that the color video bitstream contains color information data representative of a first texture image and that texture interpolation has to be done on point of a reconstructed point cloud that are not colorized from said color information data, a first texture image is reconstructed from said color information data and, and colors are assigned to points of a reconstructed point cloud that are not colorized from said color information data as shown on FIG. 7.

In a variant, said interpolation texture coding mode may also indicates which interpolation process to be used.

According to a first embodiment, said interpolation texture coding mode indicates that the interpolation process uses the color transfer algorithm of TMC2 (see 9.1).

According to a first embodiment, said interpolation texture coding mode indicates that the interpolation process is as follows:

Let:

$\widehat{P_{T0}}$ be the reconstructed point cloud after texture reconstruction (using decoded T0 and $p_i$ be a point of $\widehat{P_{T0}}$ with no assigned color $t0_i$ be a point of $\widehat{P_{T0}}$ with a color assigned thanks to the reconstructed texture image T0

For each point $p_i$, take the N closest neighbors $t0_i$ (a typical value of N is 5) and apply for each neighbor:

if $(Dist(p_i)-Dist(t0_i))$<threshold, then $Color(p_i)=Color(t0_i)$ otherwise, $Color(p_i) = \sum_{k=0}^{N} weight * Color(t0_k)$ with $weight = \dfrac{1}{\sqrt{distance(p_i, t0_k)^2}}$ A typical value for the threshold is 0.001.

A metadata in the color video bitstream indicates if an interpolation texture process has to be done to reconstruct a texture image, i.e. indicates that the color video bitstream contains color information data representative of a first texture image and that texture interpolation has to be done on point of a reconstructed point cloud that are not colorized from said color information data.

In a variant, said interpolation texture coding mode may also indicates which interpolation process to be used.

Let itcm be an interpolation texture mode indicating which interpolation process to be applied.

These values could be coded by image, frame or by group of frames according to the decision process made by encoder.

Examples of itcm Mode Metadata

One first example could be to code the interpolation texture coding mode as flag (on/off) to activate and desactivate the texture interpolation process:

Off 2 texture images per frame, no texture interpolation
On: 1 texture image per frame, texture interpolation Another example could be to code the interpolation texture coding mode as integer and defined several interpolation processes.

TABLE 1

| ReadArithmetic( ) function | |
|---|---|
| itcm_mode | DecodeUint8 |
| For all patches | |
|    U0 | DecodeUInt32(bitCountU0) |
|    V0 | DecodeUInt32(bitCountV0) |
|    U1 | DecodeUInt32(bitCountU1) |
|    V1 | DecodeUInt32(bitCountV1) |
|    D1 | DecodeUInt32(bitCountD1) |
|    deltaSizeU0 | DecodeExpGolomb( ) |
|    deltaSizeV0 | DecodeExpGolomb( ) |
| // Block to patch index decoding | |
| For all blocks | |
|    If number of candidate patches > 1 | |
|      Candidate index | Decode |
|      If Candidate index == maxCandidateCount | |
|        block to patch index | DecodeUInt32(bitCountPatch) |
|      Else | |
|        Block to patch index = Candidate index | |
| // Occupancy map decoding | |
| For all blocks | |
|    If Block to patch index > 0 | |
|      isFull | decode |
|      If not Full | |
|        bestTraversalOrderIndex | decode |
|        runCountMinusTwo | decode |
|        Occupancy | decode |
|        for (size_t r = 0; r < runCountMinusOne; ++r) | |
|        { | |

TABLE 1-continued

| ReadArithmetic( ) function | |
|---|---|
|          runLength | decode |
|          for (size_t j = 0; j <= runLength; ++j) | |
|            Block[ traversalOrder[ i++ ] ] = occupancy; | |
|            occupancy = !occupancy; | |
|          } | |
|      For all remaining blocks | |
|        Block[ traversalOrder[ i++ ] ] = occupancy; | |

Example of itcm in a SEI Message in HEVC

| Syntax | Descriptor |
|---|---|
| itcm_info( payloadSize ) { | |
|    itcm_mode | u(8) |
| } | | itcm_mode contains an identifying number that is used to identify the interpolation texture coding mode. When itcm_mode equals to 0 it means the texture of depth 1 is not interpolated and texture 1 has to be decoded as in TMC2. The itcm_mode could be also In a SPS ou PPS message.

On FIG. 1-7, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the present embodiments are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 8:
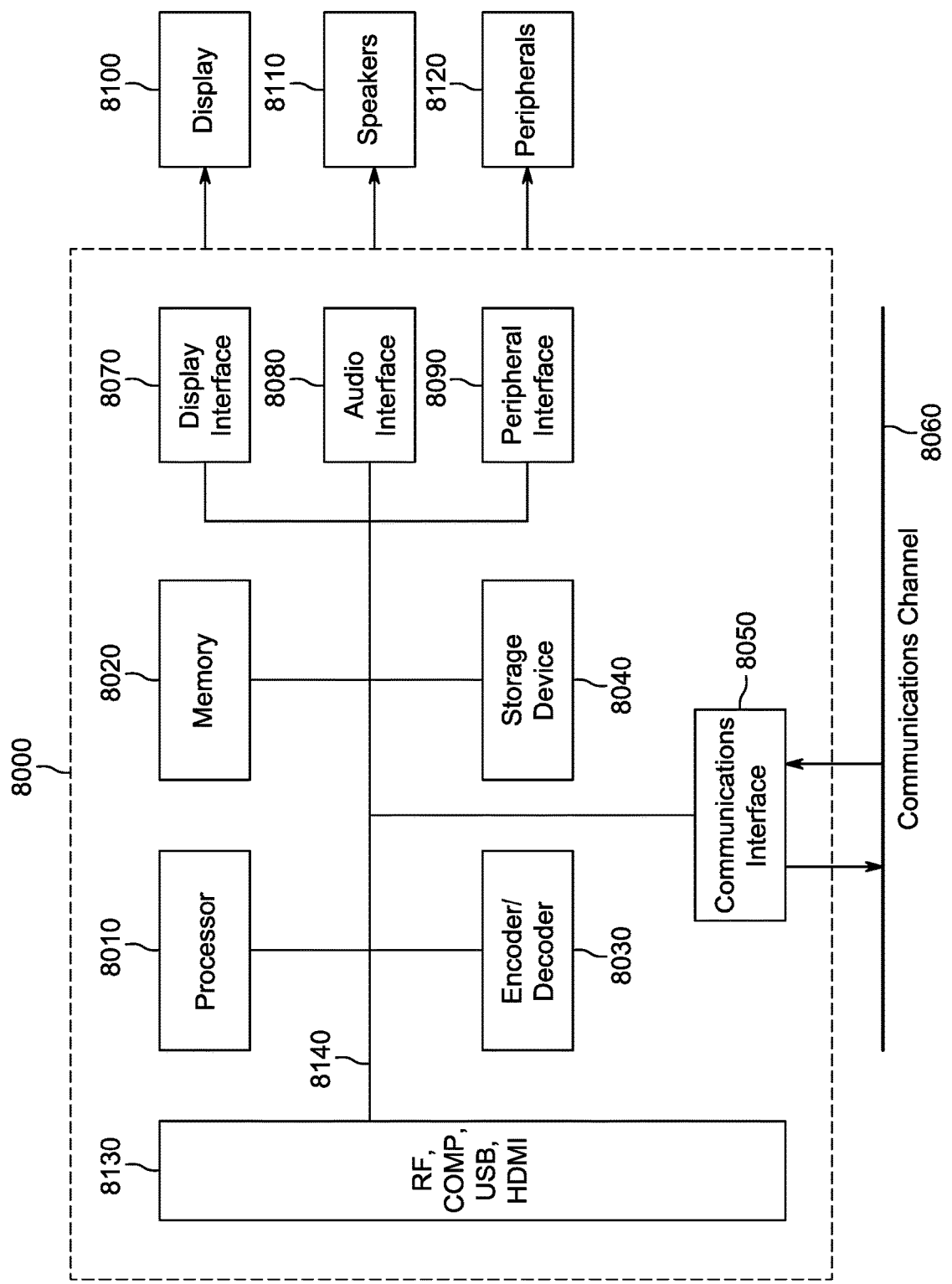
FIG. 8 illustrates a block diagram of an example of a system in which various aspects and embodiments are implemented.

FIG. 8 illustrates a block diagram of an example of a system in which various aspects and embodiments are implemented. System 8000 can be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 8000, singly or in combination, can be embodied in a single integrated circuit, multiple ICs, and/or discrete components. For example, in at least one embodiment, the processing and encoder/decoder elements of system 8000 are distributed across multiple ICs and/or discrete components. In various embodiments, the system 8000 is communicatively coupled to other similar systems, or to other electronic devices, via, for example, a communications bus or through dedicated input and/or output ports. In various embodiments, the system 8000 is configured to implement one or more of the aspects described in this document.

The system 8000 includes at least one processor 8010 configured to execute instructions loaded therein for implementing, for example, the various aspects described in this document. Processor 8010 can include embedded memory, input output interface, and various other circuitries as known in the art. The system 8000 includes at least one memory 8020 (e.g., a volatile memory device, and/or a non-volatile memory device). System 8000 includes a storage device 8040, which can include non-volatile memory and/or volatile memory, including, but not limited to, EEPROM, ROM, PROM, RAM, DRAM, SRAM, flash, magnetic disk drive, and/or optical disk drive. The storage device 8040 can include an internal storage device, an attached storage device, and/or a network accessible storage device, as non-limiting examples.

System 8000 includes an encoder/decoder module 8030 configured, for example, to process data to provide an encoded video or decoded video, and the encoder/decoder module 8030 can include its own processor and memory. The encoder/decoder module 8030 represents module(s) that can be included in a device to perform the encoding and/or decoding functions. As is known, a device can include one or both of the encoding and decoding modules. Additionally, encoder/decoder module 8030 can be implemented as a separate element of system 8000 or can be incorporated within processor 8010 as a combination of hardware and software as known to those skilled in the art.

Program code to be loaded onto processor 8010 or encoder/decoder 8030 to perform the various aspects described in this document can be stored in storage device 8040 and subsequently loaded onto memory 8020 for execution by processor 8010. In accordance with various embodiments, one or more of processor 8010, memory 8020, storage device 8040, and encoder/decoder module 8030 can store one or more of various items during the performance of the processes described in this document. Such stored items can include, but are not limited to, the input video, the decoded video, the point cloud or portions of the decoded video, the bitstream, the reconstructed point cloud, matrices, variables, and intermediate or final results from the processing of equations, formulas, operations, and operational logic.

In several embodiments, memory inside of the processor 8010 and/or the encoder/decoder module 8030 is used to store instructions and to provide working memory for processing that is needed during encoding or decoding.

In other embodiments, however, a memory external to the processing device (for example, the processing device can be either the processor 8010 or the encoder/decoder module 8030) is used for one or more of these functions. The external memory can be the memory 8020 and/or the storage device 8040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, WC (Versatile Video Coding) or TMC2.

The input to the elements of system 8000 can be provided through various input devices as indicated in block 8130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 8130 have associated respective input processing elements as known in the art. For example, the RF portion can be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband.

In one set-top box embodiment, the RF portion and its associated input processing element receives an RF signal transmitted over a wired (for example, cable) medium, and performs frequency selection by filtering, down-converting, and filtering again to a desired frequency band.

Various embodiments rearrange the order of the above-described (and other) elements, remove some of these elements, and/or add other elements performing similar or different functions.

Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 8000 to other electronic devices across USB and/or HDMI connections. It is to be understood that various aspects of input processing, for example, Reed-Solomon error correction, can be implemented, for example, within a separate input processing IC or within processor 8010 as necessary. Similarly, aspects of USB or HDMI interface processing can be implemented within separate interface ICs or within processor 8010 as necessary. The demodulated, error corrected, and demultiplexed stream is provided to various processing elements, including, for example, processor 8010, and encoder/decoder 8030 operating in combination with the memory and storage elements to process the data stream as necessary for presentation on an output device.

Various elements of system 8000 can be provided within an integrated housing. Within the integrated housing, the various elements can be interconnected and transmit data therebetween using suitable connection arrangement, for example, an internal bus as known in the art, including the I2C bus, wiring, and printed circuit boards.

The system 8000 includes communication interface 8050 that enables communication with other devices via communication channel 8060. The communication interface 8050 can include, but is not limited to, a transceiver configured to transmit and to receive data over communication channel 8060. The communication interface 8050 can include, but is not limited to, a modem or network card and the communication channel 8060 can be implemented, for example, within a wired and/or a wireless medium.

Data is streamed to the system 8000, in various embodiments, using a Wi-Fi network such as IEEE 802.11. The Wi-Fi signal of these embodiments is received over the communications channel 8060 and the communications interface 8050 which are adapted for Wi-Fi communications. The communications channel 8060 of these embodiments is typically connected to an access point or router that provides access to outside networks including the Internet for allowing streaming applications and other over-the-top communications.

Other embodiments provide streamed data to the system 8000 using a set-top box that delivers the data over the HDMI connection of the input block 8130.

Still other embodiments provide streamed data to the system 8000 using the RF connection of the input block 8130.

The system 8000 can provide an output signal to various output devices, including a display 8100, speakers 8110, and other peripheral devices 8120. The other peripheral devices 8120 include, in various devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present embodiments, or to carry as data the actual syntax-values written by a described example of the present embodiments. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
   decoding a first texture image from color information data decoded from a bitstream,
   decoding a point cloud from the bitstream, the decoded point cloud comprising colorized 3D points and non-colorized 3D points,
   colorized 3D points being 3D points of the decoded point cloud whose color value is assigned from the decoded first texture image,
   non-colorized 3D points being 3D points of the decoded point cloud having no color value assigned from color information data decoded from the bitstream,
   decoding from the bitstream, an information representative of an interpolation texture coding mode, the interpolation texture coding mode indicating whether texture interpolation has to be done for the non-colorized 3D points of the point cloud,
   responsive to a determination that the interpolation texture coding mode indicates that texture interpolation has to be done for the non-colorized 3D points of the point cloud, assigning a color value to at least one non-colorized 3D point as a function of colorized 3D points of the decoded point cloud neighboring in the point cloud the at least one non-colorized 3D point.

2. The method of claim 1, wherein said interpolation texture coding mode further indicates which texture interpolation to be used.

3. The method of claim 1, wherein the interpolation texture coding mode indicates that an interpolation texture process has to be done to reconstruct a second texture image.

4. The method of claim 1, wherein said interpolation texture coding mode is transmitted as an image or a metadata.

5. An apparatus comprising one or more processors configured for encoding a point cloud in a bitstream, wherein encoding the point cloud comprises:
   encoding color information data representative of a first texture image from which at least one point of the point cloud is colorized when decoding the point cloud,
   encoding the point cloud in the bitstream wherein the coded point cloud comprises colorized 3D points and non-colorized 3D points,
   colorized 3D points being 3D points of the point cloud whose color value is assigned from the first texture image when decoding the point cloud,
   non-colorized 3D points being 3D points of the point cloud having no color value assigned from color information data encoded in the bitstream, encoding an information representative of an interpolation texture coding mode, the interpolation texture coding mode indicating whether texture interpolation has to be done for non-colorized 3D points of the point cloud when decoding the point cloud, wherein texture interpolation for the non-colorized 3D points of the point cloud is a function of colorized 3D points of the point cloud neighboring in the point cloud the non-colorized 3D points.

6. The apparatus of claim 5, wherein the interpolation texture coding mode indicates that an interpolation texture process has to be done to reconstruct a second texture image.

7. A non-transitory computer-readable medium including instructions for causing one or more processors to carry out the method of claim 1.

8. A method comprising encoding a point cloud in a bitstream, wherein encoding the point cloud comprises:
  encoding color information data representative of a first texture image from which at least one point of the point cloud is colorized when decoding the point cloud,
  encoding the point cloud in the bitstream wherein the coded point cloud comprises colorized 3D points and non-colorized 3D points,
  colorized 3D points being 3D points of the point cloud whose color value is assigned from the first texture image when decoding the point cloud,
  non-colorized 3D points being 3D points of the point cloud having no color value assigned from color information data encoded from the bitstream,
  encoding an information representative of an interpolation texture coding mode, the interpolation texture coding mode indicating whether texture interpolation has to be done for non-colorized 3D points of the point cloud when decoding the point cloud, wherein texture interpolation for non-colorized 3D points is a function of colorized 3D points of the point cloud neighboring in the point cloud the non-colorized 3D points.

9. The method of claim 8, wherein the interpolation texture coding mode indicates that an interpolation texture process has to be done to reconstruct a second texture image.

10. The method of claim 8, wherein said interpolation texture coding mode is transmitted as an image or a metadata.

11. An apparatus comprising one or more processors configured for decoding a point cloud from a bitstream, wherein decoding the point cloud comprises:
  decoding a first texture image from color information data decoded from a bitstream,
  decoding the point cloud from the bitstream, the decoded point cloud comprising colorized 3D points and non-colorized 3D points,
  colorized 3D points being 3D points of the decoded point cloud whose color value is assigned from the decoded first texture image,
  non-colorized 3D points being 3D points of the decoded point cloud having no color value assigned from color information data decoded from the bitstream,
  decoding from the bitstream, an information representative of an interpolation texture coding mode, the interpolation coding mode indicating whether texture interpolation has to be done for non-colorized 3D points of the point cloud,
  responsive to a determination that the interpolation texture coding mode indicates that texture interpolation has to be done for non-colorized 3D points of the point cloud, assigning a color value to at least one non-colorized 3D point as a function of colorized 3D points of the decoded point cloud neighboring in the point cloud the at least one non-colorized 3D point.

12. The apparatus of claim 11, wherein the interpolation texture coding mode indicates that an interpolation texture process has to be done to reconstruct a second texture image.

13. A non-transitory computer-readable medium including instructions for causing one or more processors to carry out the method of claim 8.

14. The method of claim 1, further comprising:
  decoding a second texture image from the color information data decoded from the bitstream,
  the interpolation texture coding mode indicating that texture interpolation has not to be done for non-colorized 3D points of the point cloud,
  assigning a color value to at least one non-colorized 3D point from the decoded second texture image.

15. The method of claim 8, wherein
  the color information data is further representative of a second texture,
  the interpolation texture coding mode indicating that texture interpolation has not to be done for non-colorized 3D points of the point cloud,
  the method further comprising assigning a color value to at least one non-colorized 3D point from the second texture image.

16. The apparatus of claim 11, wherein decoding the point cloud further comprises:
  decoding a second texture image from the color information data decoded from the bitstream,
  the interpolation texture coding mode indicating that texture interpolation has not to be done for non-colorized 3D points of the point cloud,
  assigning a color value to at least one non-colorized 3D point from the decoded second texture image.

17. The apparatus of claim 5, wherein encoding the point cloud further comprises:
  the color information data is further representative of a second texture,
  the interpolation texture coding mode indicating that texture interpolation has not to be done for non-colorized 3D points of the point cloud,
  the method further comprising assigning a color value to at least one non-colorized 3D point from the second texture image.

* * * * *